(12) United States Patent
Fujita et al.

(10) Patent No.: US 8,125,773 B2
(45) Date of Patent: Feb. 28, 2012

(54) ELECTRONIC EQUIPMENT

(75) Inventors: Shinji Fujita, Osaka (JP); Syuji Yasuoka, Osaka (JP)

(73) Assignee: Panasonic Corporation, Osaka (JP)

( * ) Notice: Subject to any disclaimer, the term of this patent is extended or adjusted under 35 U.S.C. 154(b) by 196 days.

(21) Appl. No.: 12/715,563

(22) Filed: Mar. 2, 2010

(65) Prior Publication Data
US 2010/0226082 A1 Sep. 9, 2010

(30) Foreign Application Priority Data

Mar. 4, 2009 (JP) ................................ 2009-050966

(51) Int. Cl.
*G06F 1/16* (2006.01)
(52) U.S. Cl. .................. 361/679.26; 353/122; 345/420; 250/559.38; 248/454
(58) Field of Classification Search .............. 353/43.85, 353/122, 119; 206/320, 576, 170; 345/156, 345/173, 184, 157, 420, 179, 163, 419; 312/223.2, 312/223.3, 223.6, 27, 194, 198; 250/227.14, 250/589, 559.38; 248/346.03, 452, 346.01, 248/371, 317; 361/679.55, 679.33, 679.4, 361/679.58, 679.6, 679.26, 679.27, 679.08, 361/679.02
See application file for complete search history.

(56) References Cited

U.S. PATENT DOCUMENTS 7,871,019 B1 * 1/2011 Hou .............................. 239/443
2010/0219621 A1 * 9/2010 Sasaki et al. .................. 280/731

FOREIGN PATENT DOCUMENTS

JP 5-217620 A 8/1993

* cited by examiner

*Primary Examiner* — Hung Duong
(74) *Attorney, Agent, or Firm* — Hamre, Schumann, Mueller & Larson, P.C.

(57) ABSTRACT

Electronic equipment according to the present invention can be attached removably to another device with screws 5a and 5b. The equipment includes: a housing 1; a through hole 4d that is formed in the housing 1 and in which each of the screws 5a and 5b is inserted and supported; and a bush 21 that can be attached removably to a head 5c of each of the screws 5a and 5b that is inserted and supported in the through hole 4d. The bush 21 includes a through hole 21 into which the head 5c of each of the screws 5a and 5b can be pressed and mounted. At least a part of the bush 21 is in contact with the housing 1 when the head 5c of each of the screws 5a and 5b is pressed and mounted into the bush 21. Thus, it is possible to provide electronic equipment in which screws are less likely to come loose even when subjected to a disturbance such as vibrations.

8 Claims, 13 Drawing Sheets

ELECTRONIC EQUIPMENT

BACKGROUND OF THE INVENTION

1. Field of the Invention

The present invention relates to electronic equipment that can be attached removably to another device.

2. Description of Related Art

Conventionally, electronic devices such as a notebook personal computer can be connected with an expansion device. The expansion device can be connected to the electronic device via an adapter or by being directly attached to the electronic device with screws or the like.

JP 5(1993)-217620 A discloses a configuration in which a portable device such as a notebook personal computer is connected with an expansion device via a cable. According to the configuration disclosed in JP 5(1993)-217620 A, a connector provided at an end of the cable is fixed to a connecter on the portable device side with screws.

However, according to the configuration in which the connecter of the cable is screwed to the connecter on the portable device side with screws as disclosed in JP 5(1993)-217620 A, a disturbance such as vibrations may loosen the screws, raising the possibility of the cable being detached from the portable device.

Further, according to a configuration in which a connector of a portable device is joined directly and mechanically to a connector of an expansion device, when screws come loose, the expansion device may be detached from the portable device and damaged.

SUMMARY OF THE INVENTION

It is an object of the present invention to provide electronic equipment in which screws are less likely to come loose even when subjected to a disturbance such as vibrations.

Electronic equipment according to the present invention enables a first housing to be screwed to a second housing with a screw. The equipment includes: a support portion that is formed in the first housing and in which the screw is inserted and supported; and an elastic member that can be attached removably to a head of the screw that is inserted and supported in the support portion. The elastic member includes: a through hole into which the head of the screw can be pressed and mounted; and a contact portion where at least a part of the elastic member is in contact with the first housing when the head of the screw is pressed and mounted into the elastic member.

According to the present invention, an expansion device can be connected stably for a long time even in an in-vehicle environment or the like in which the connected device is subjected to frequent vibrations.

DETAILED DESCRIPTION OF THE INVENTION

Figure 1:
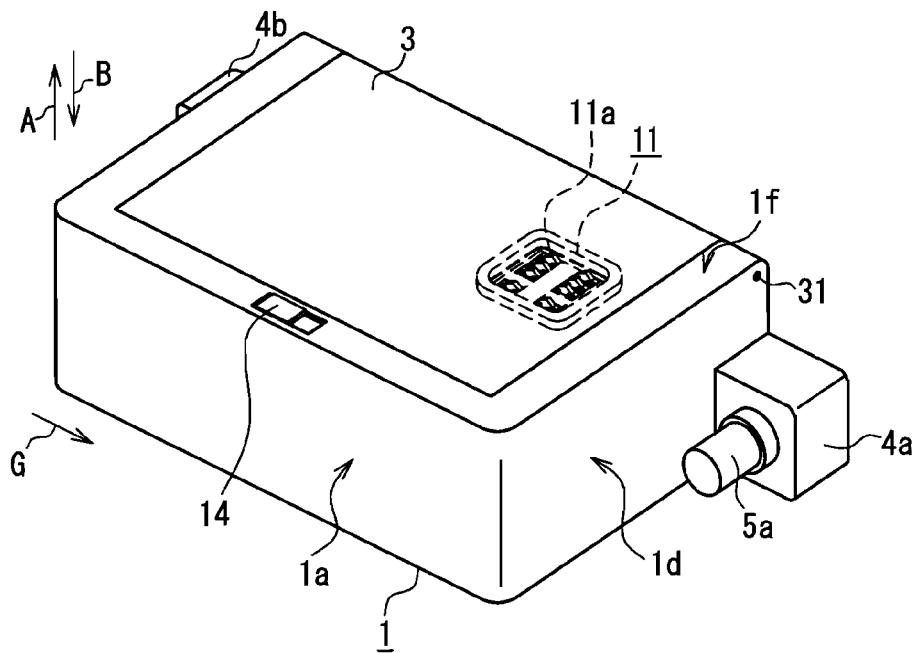
FIG. 1 is a perspective view showing an appearance (on the front face side) of a card holding apparatus provided with a lid opening/dosing device according to an embodiment.

Electronic equipment according to the present invention enables a first housing to be screwed to a second housing with a screw. The equipment includes: a support portion that is formed in the first housing and in which the screw is inserted and supported; and an elastic member that can be attached removably to a head of the screw that is inserted and supported in the support portion. The elastic member includes: a through hole into which the head of the screw can be pressed and mounted; and a contact portion where at least a part of the elastic member is in contact with the first housing when the head of the screw is pressed and mounted into the elastic member.

In the electronic equipment according to the present invention, the elastic member can be formed into a columnar shape, the through hole can be formed between both end faces of the elastic member in an axial direction of a column, and one of the both end faces of the elastic member in the axial direction of the column can be in contact with the first housing when the head of the screw is pressed into the through hole. With this configuration, friction is produced between the elastic member and the head of the screw as well as between the elastic member and the first housing, so that the rotation of the screw about an axis can be regulated. Thus, it is possible to restrain the screw from coming loose due to a disturbance such as vibrations, thereby preventing the detachment of the first housing from the second housing.

In the electronic equipment according to the present invention, the elastic member can be formed into a columnar shape, the through hole can be formed between both end faces of the elastic member in an axial direction of a column, and a part of a side face of the elastic member parallel to the axial direction of the column can be in contact with the first housing when the head of the screw is pressed into the through hole. With this configuration, friction is produced between the elastic member and the head of the screw as well as between a part of the side face of the elastic member and the first housing, so that the rotation of the screw about the axis can be regulated. Thus, it is possible to restrain the screw from coming loose due to a disturbance such as vibrations, thereby preventing the detachment of the first housing from the second housing.

In the electronic equipment according to the present invention, the elastic member can have at least one plane on a side face parallel to the axial direction of the column. With this configuration, the elastic member detached from the screw is less likely to roll, and thus it is possible to reduce the likelihood of the loss of the elastic member.

In the electronic equipment according to the present invention, the elastic member can have a groove between the both end faces in the axial direction of the column. With this configuration, when a cord or the like is wound around the groove and pulled in a detachment direction, the elastic member can be detached from the screw easily. Further, when a cord or the like is wound around the groove with its end fixed to the housing or the like, it is possible to avoid the loss of the elastic member detached from the screw.

(Embodiment)

[1. Configuration of Electronic Equipment]

In the present embodiment, a card holding apparatus is an example of electronic equipment. A card-type medium such as a smart card can be loaded removably into the cart holding apparatus. The card holding apparatus can be connected to an information device such as a personal computer (hereinafter, referred to as a "PC"). The electronic equipment of the present embodiment is not limited to the card holding apparatus, and may be any expansion device that can be attached removably to another device with screws.

Figure 2:
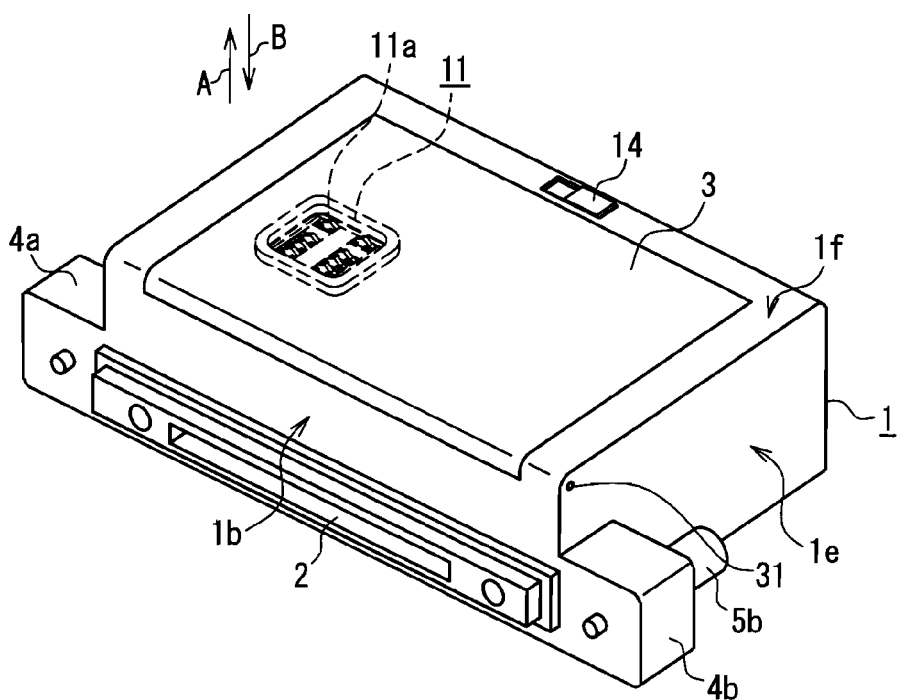
FIG. 2 is a perspective view showing an appearance (on the rear face side) of the card holding apparatus provided with the lid opening/dosing device according to the present embodiment.
Figure 3:
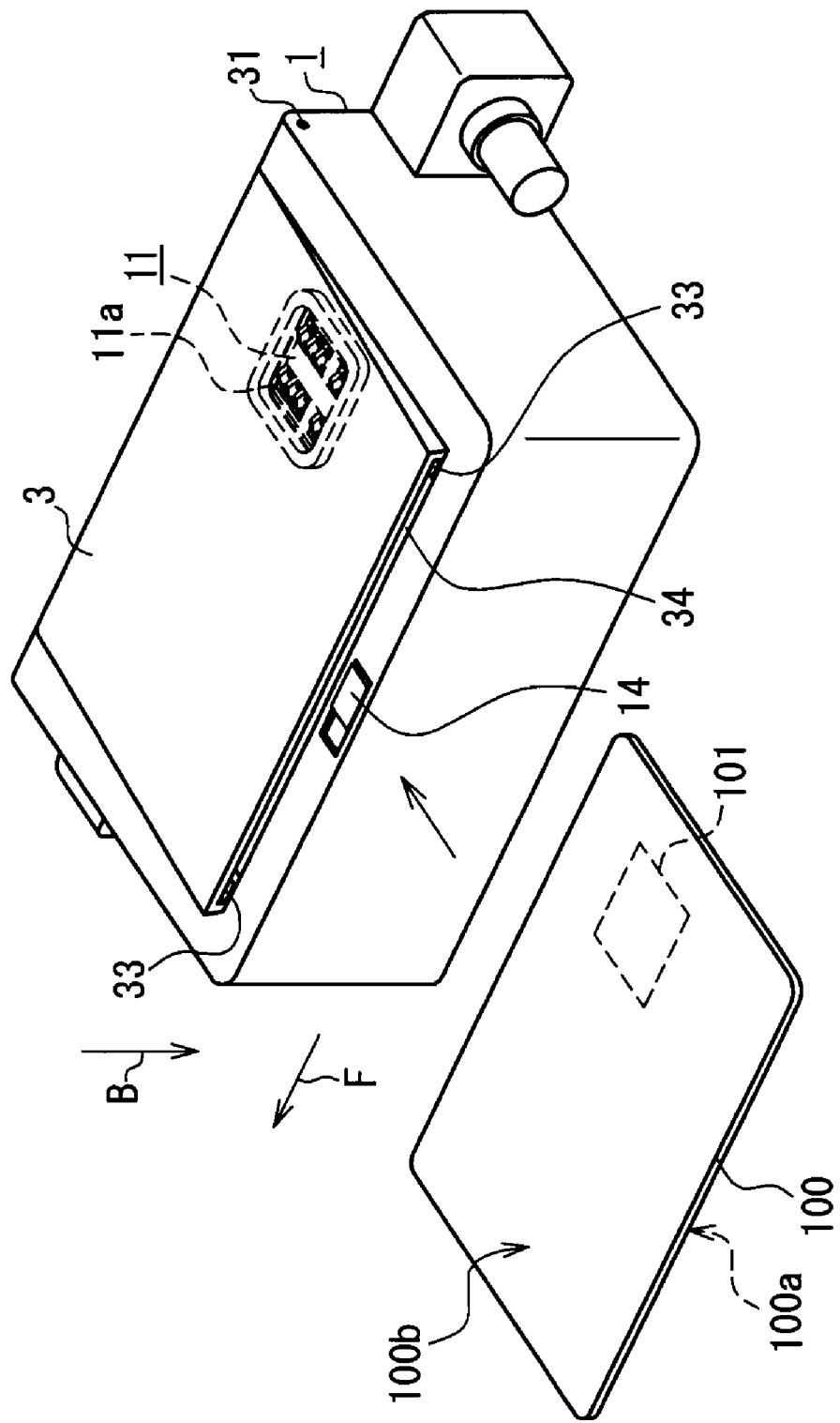
FIG. 3 is a perspective view of a smart card and the card holding apparatus.

FIG. 1 is a perspective view showing an appearance (on the front face side) of the card holding apparatus that is an example of the electronic equipment of the present embodiment. FIG. 2 is a perspective view showing an appearance (on the rear face side) of the card holding apparatus. FIG. 3 is a perspective view showing the card holding apparatus with a card lid open.

As shown in FIGS. 1 and 2, the card holding apparatus includes a housing 1 that forms an approximately rectangular parallelepiped, in which electric circuit components (not shown) are incorporated. As shown in FIG. 2, a connector 2 capable of being connected to various types of information processing units such as a PC 50 (described later with reference to FIG. 4) is provided on a rear face 1b of the housing 1. A rib 4a that supports a screw 5a is formed on a right side face 1d of the housing 1 so as to protrude therefrom. It should be noted that the right side face 1d is a face located on the user's right hand side when the card holding apparatus is positioned with a front face 1a facing a user and a face on which a card lid 3 is disposed facing upward. The rib 4a has a through hole 4d (described later) in which the screw 5a is inserted and supported. A rib 4b that supports a screw 5b is formed on a left side face 1e of the housing 1 so as to protrude therefrom. It should be noted that the left side face 1e is a face located at the back of the right side face 1d. The rib 4b has the through hole 4d (described later) in which the screw 5b is inserted and supported. The screws 5a and 5b can be screwed into threaded holes 51b (described later) formed in the PC 50 (described later). Further, the card lid 3 and a lock lever 14 are provided on an upper face 1f (one of the faces adjacent to the front face 1a, the rear face 1b, the right side face 1d, and the left side face 1e) of the housing 1.

The card lid 3 is generally an approximately plate-like member having a rectangular principal plane. The principal plane of the approximately plate-like member of the card lid 3 has an area larger than at least the area of a principal plane of a smart card 100 (see FIG. 3). The card lid 3 is supported by the housing 1 via a supporting shaft 31 at the vicinity of one of the longer side portions of the approximately plate-like member. The card lid 3 is rotatable about an axis of the supporting shaft 31 in directions indicated by arrows A and B. The card lid 3 can shift between a closed position and an open position. The closed position is a position where a card holding portion in the housing 1 is closed, while the open position is a position where the card holding portion in the housing 1 is open.

On a principal plane of the card lid 3 that faces the card holding portion of the horsing 1 (hereinafter, referred to as a "back face of the card lid 3"), which is one of a pair of front and back principal planes of the card lid 3, the card lid 3 includes a pair of card retaining portions 33 (see FIG. 3) that can retain the smart card 100 (described later). The card retaining portions 33 are formed in the vicinities of respective ends on the back face of the card lid 3. The card retaining portions 33 have an approximately L-shaped profile in cross-section. The card retaining portions 33 are formed along the shorter sides of the card lid 3. Further, the card lid 3 has an opening 34 into which the smart card 100 can be inserted, between the pair of card retaining portions 33. The opening 34 has a width dimension that is larger than at least the dimension of the smart card 100 in the longitudinal direction.

The lock lever 14 can slide in directions indicated by arrows F and G. When the lock lever 14 is at a position shown in FIGS. 1 and 2, the lock lever 14 is engaged with a claw portion (not shown) formed in the card lid 3. The engagement between the lock level 14 and the claw portion allows the card lid 3 to be positioned at the closed position. On the other hand, when the lock lever 14 is at a position shown in FIG. 3, the lock lever 14 is disengaged from the claw portion (not shown) formed in the card lid 3. The disengagement of the lock level 14 from the claw portion allows the card lid 3 to be in a rotatable state.

A contact terminal portion 11 is disposed in a portion covered with the card lid 3 in the housing 1. The contact terminal portion 11 includes a plurality of contact terminals 11a. The contact terminals 11a are made of an elastic, approximately plate-like metal. In the present embodiment, there are as many contact terminals 11a, i.e., eight, as contact areas of a terminal 101 of the smart card 100.

As shown in FIG. 3, as to the smart card 100, the physical characteristics and the electrical characteristics are defined based on the international standard ISO 7816, and the Japanese Industrial Standard JIS X 6303 also defines the physical characteristics, the locations and the dimensions of external terminals, and the like. The smart card 100 is in conformity with these standards, and has dimensions of, for example, about 95 mm in width, about 54 mm in depth, and about 0.5 to 1.0 mm in thickness. The smart card 100 incorporates an IC chip (integrated circuit). The terminal 101 is disposed on at least one principal face 100a of the principal faces of the smart card 100. The terminal 101 is connected electrically to the IC chip. The IC chip includes those having a function of being capable of storing various types of information such as security information and those having a function of being capable of performing arithmetic processing. The location and the dimensions of the terminal 101 also are defined in the JIS X 6303 standard. The locations and the dimensions of the contact terminal portion 11 and the contact terminals 11a of the card holding apparatus are determined so that the card holding apparatus is compatible with a smart card that is in conformity with the JIS X 6303 standard.

When the smart card 100 is to be inserted into the card holding apparatus, the smart card 100 is positioned so that the terminal 101 is located on the right and the principal face 100a faces the contact terminal portion 11, as shown in FIG. 3, and inserted into the opening 34. The position of the smart card 100 inserted into the opening 34 is restricted by the card retaining portions 33, and the smart card 100 thus is retained by the card lid 3.

Next, the card lid 3 is rotated about the axis of the supporting shaft 31 in the direction indicated by the arrow B. The card lid 3 shifts to the closed position shown in FIGS. 1 and 2 while still retaining the smart card 100.

Then, the lock lever 14 is caused to slide from the position shown in FIG. 3 in the direction indicated by the arrow F with the card lid 3 shifted to the closed position. As a result, the card lid 3 can be fixed at the closed position.

Thus, an operation of loading the smart card 100 is completed. As a result of the rotation of the card lid 3 to the closed position, the contact terminals 11a of the contact terminal portion 11 and the terminal 101 are brought into contact with each other and thus connected electrically to each other.

[2. Configuration of Information Processing Unit]

Figure 4:
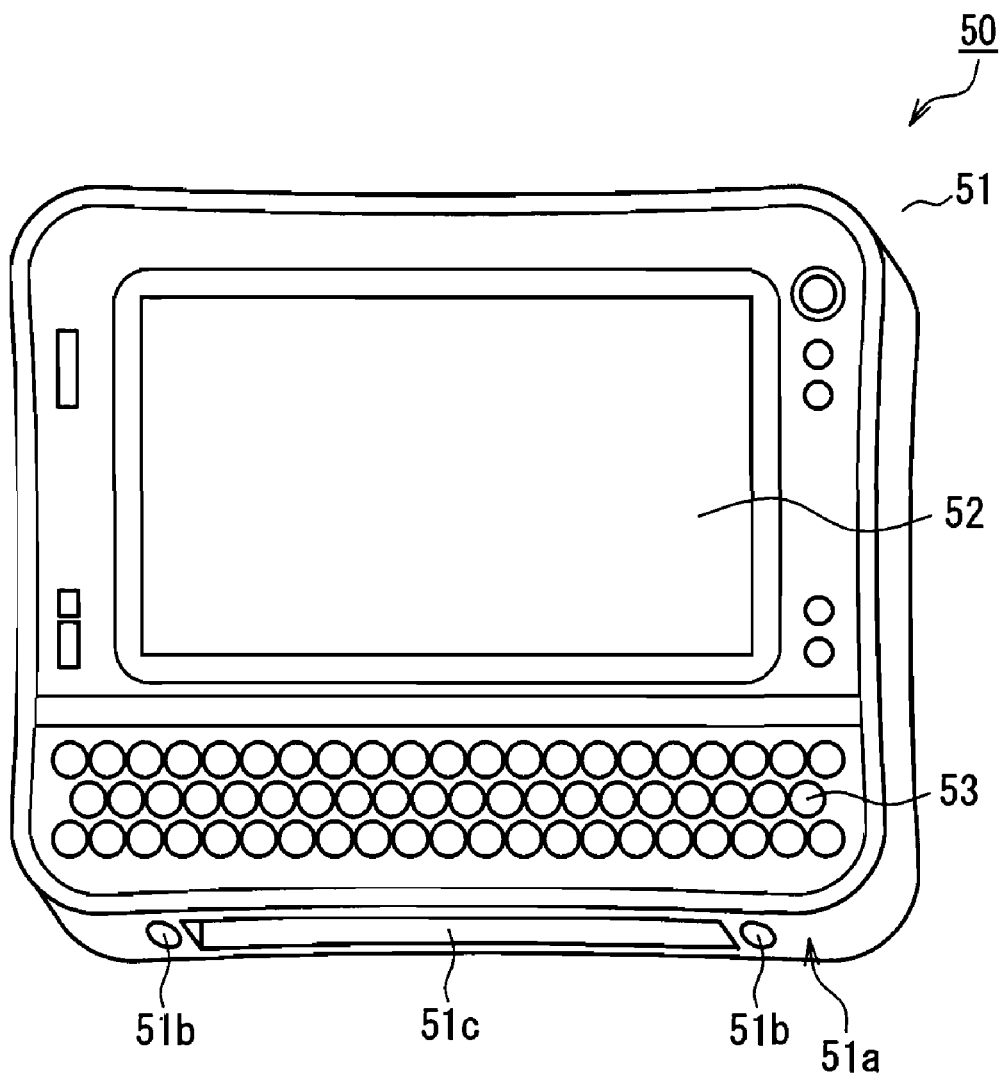
FIG. 4 is a perspective view of a personal computer that is an example of an information processing unit to which the card holding apparatus can be attached removably.
Figure 5:
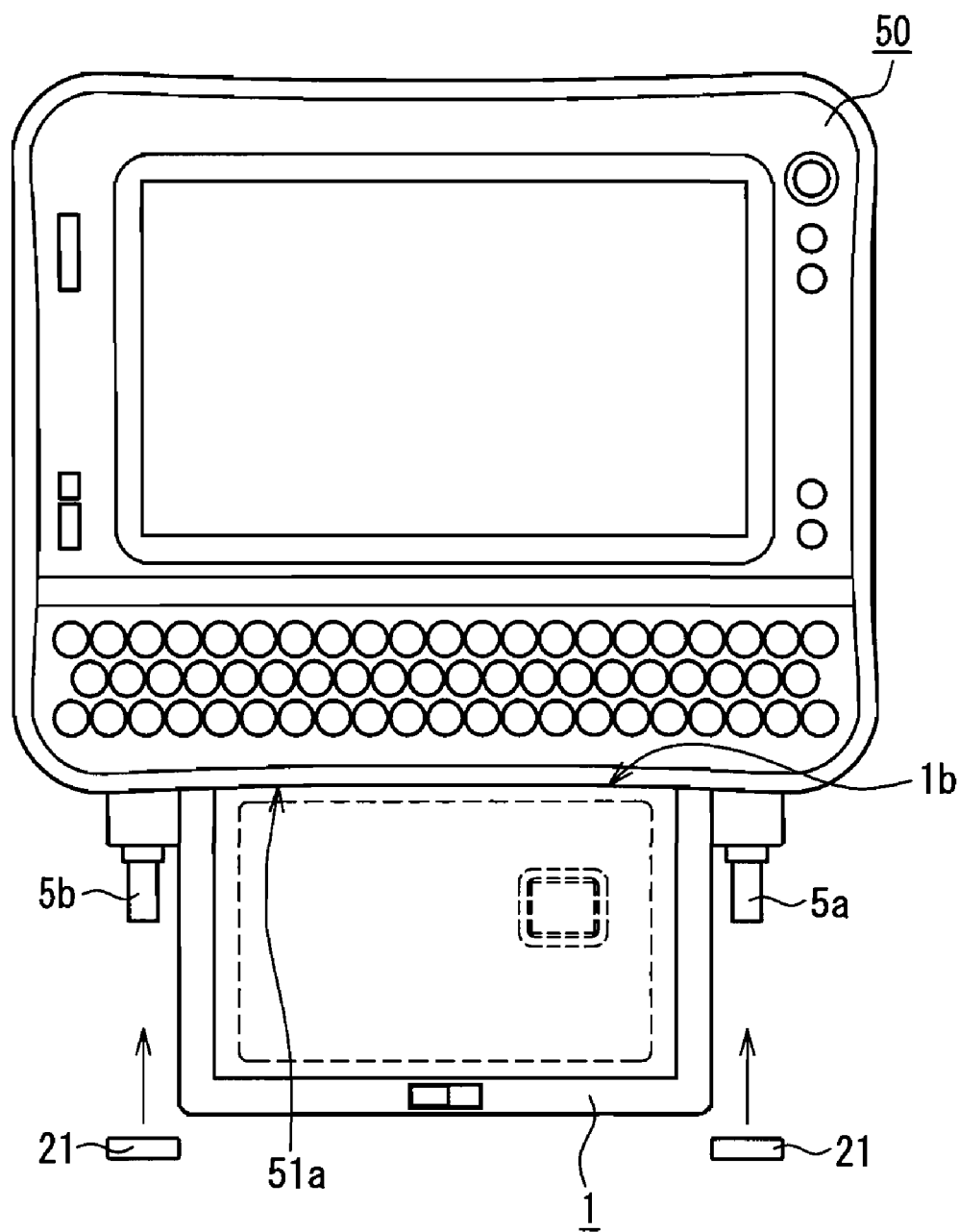
FIG. 5 is a plan view showing a state where the card holding apparatus is attached to the personal computer.

FIG. 4 is a perspective view of a PC that is an example of an information processing unit to which the card holding apparatus of the present embodiment can be attached removably. FIG. 5 is a plan view showing a state where the card holding apparatus is attached to the PC. The card holding apparatus provided with the lid opening/closing device according to the present embodiment can be attached removably to an information processing unit such as the PC shown in FIG. 4.

As shown in FIG. 4, the PC 50 includes a housing 51 that forms an approximately rectangular parallelepiped, in which a central processing unit, a storage medium (not shown), and the like are incorporated. The PC 50 includes a display 52 that can display various types of information such as an image on a principal plane of the housing 51. An operating portion 53 is disposed on the face of the housing 51 where the display 52 is provided. Through the operating portion 53, the user inputs various types of information. A connector 51c is disposed on a side face 51a of the housing 51. The connector 51c can be connected electrically with the connector 2 (see FIG. 2) of the card holding apparatus. The threaded holes 51b are disposed on the side face 51a. The screws 5a and 5b can be screwed into the threaded holes 51b.

As shown in FIG. 5, the connector 2 of the card holding apparatus and the connector 51c of the PC 50 are connected to each other with the rear face 1b of the card holding apparatus and the side face 51a of the PC 50 facing each other, and the screws 5a and 5b are screwed into the threaded holes 51b. Thus, the card holding apparatus can be attached mechanically to the PC 50, and the connector 2 and the connector 51c can be connected electrically to each other. The electrical connection between the card holding apparatus and the PC 50 allows the PC 50 and the card holding apparatus to exchange information. For example, when the smart card 100 (see FIG. 3) equipped with the IC chip having a storage area is loaded into the card holding apparatus, information can be read from or written to the IC chip on the smart card 100 by operating the PC 50. Further, in the case where the smart card 100 is a card for performing authentication in a security system, the PC 50 can read authentication information from the IC chip on the smart card 100 and execute an authentication process within the PC 50.

[3. Configuration of Bush]

As shown in FIG. 5, bushes 21 are attached to the respective screws 5a and 5b screwed into the threaded holes 51b (see FIG. 4) in the present embodiment. Hereinafter, several exemplary configurations of the bush will be described. It should be noted that the screws 5a and 5b have the same configuration, and accordingly the bushes attachable to the screws 5a and 5b also have the same configuration. In view of this, the following description is directed only to the screw 5a and the bush attachable thereto.

[3-1. First Configuration]

Figure 6A:
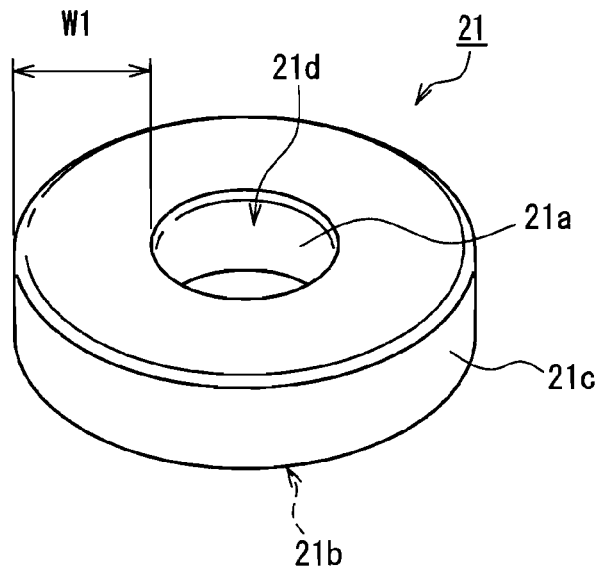
FIG. 6A is a perspective view of a bush having a first configuration.

FIG. 6A is a perspective view of the bush 21 (having a first configuration). The bush 21 is formed in an approximately columnar shape. The bush 21 is made of an elastic material such as rubber. The bush 21 has a through hole 21a between both end faces (a pair of planes adjacent to a cylindrical face 21c) in an axial direction of the column. The through hole 21a has an inner diameter dimension that is not larger than at least the outer diameter of a head 5c (described later) of each of the screws 5a and 5b, and allows the head 5c to be pressed thereinto.

Figure 6B:
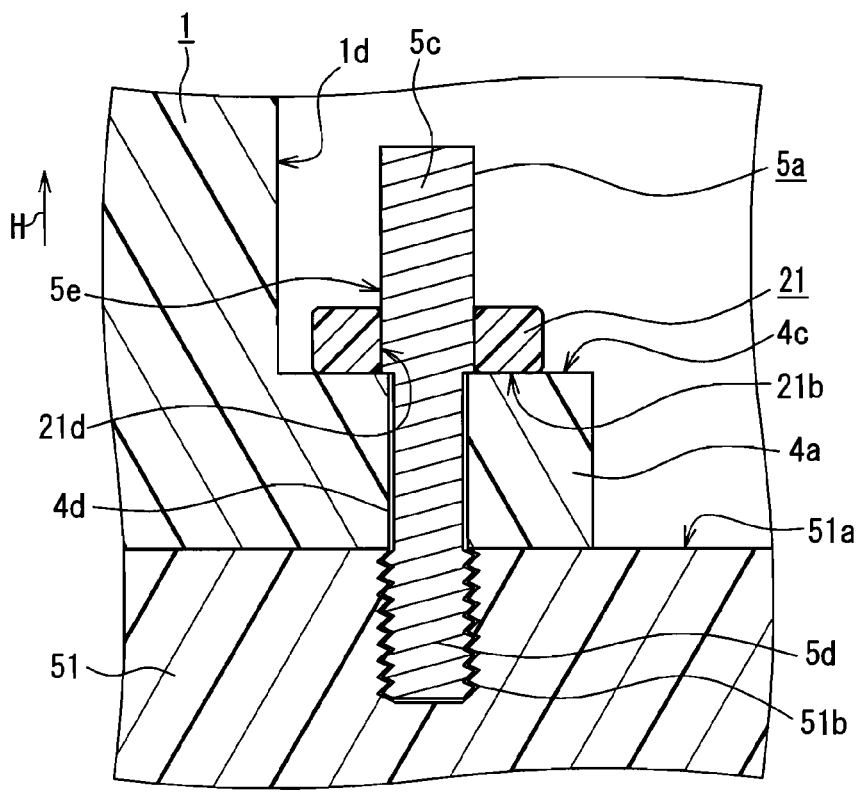
FIG. 6B is a cross-sectional view showing a relevant part in the vicinity of a screw to which the bush is attached.

FIG. 6B is a cross-sectional view showing a state where the bush 21 is attached to the screw 5a. As shown in FIG. 6B, the screw 5a is inserted and supported in the through hole 4d. A male screw portion 5d of the screw 5a is screwed into the threaded hole 51b. As shown in FIG. 6B, in the case where a sufficient space is present between the screw 5a screwed into the threaded hole 51b and the right side face 1d of the housing 1, the bush 21 can be fitted with the head 5c of the screw 5a until one of the planes adjacent to the cylindrical face 21c (in FIG. 6B, a bottom face 21b) comes into contact with a limiting face 4c. Fitting the bush 21 with the head 5c produces friction between an inner face 21d of the through hole 21a and a cylindrical face 5e of the head 5c of the screw 5a, so that the bush 21 can be fixed to the screw 5a. Further, fitting the bush 21 with the screw 5a until the bottom face 21b comes into contact with the limiting face 4c produces friction between the bottom face 21b and the limiting face 4c, so that the rotation of the screw 5a about an axis can be regulated. When the rotation of the screw 5a about the axis is regulated, it is possible to restrain the screw 5a from being displaced easily in a direction in which the screw 5a comes loose (direction indicated by an arrow H) and thus to prevent the screw 5a from coming loose due to vibrations and the like.

When the bush 21 is to be removed from the screw 5a, the bush 21 is pulled in the direction of the arrow H with the cylindrical face 21c held. In this manner, the bush 21 can be removed easily.

Figure 6C:
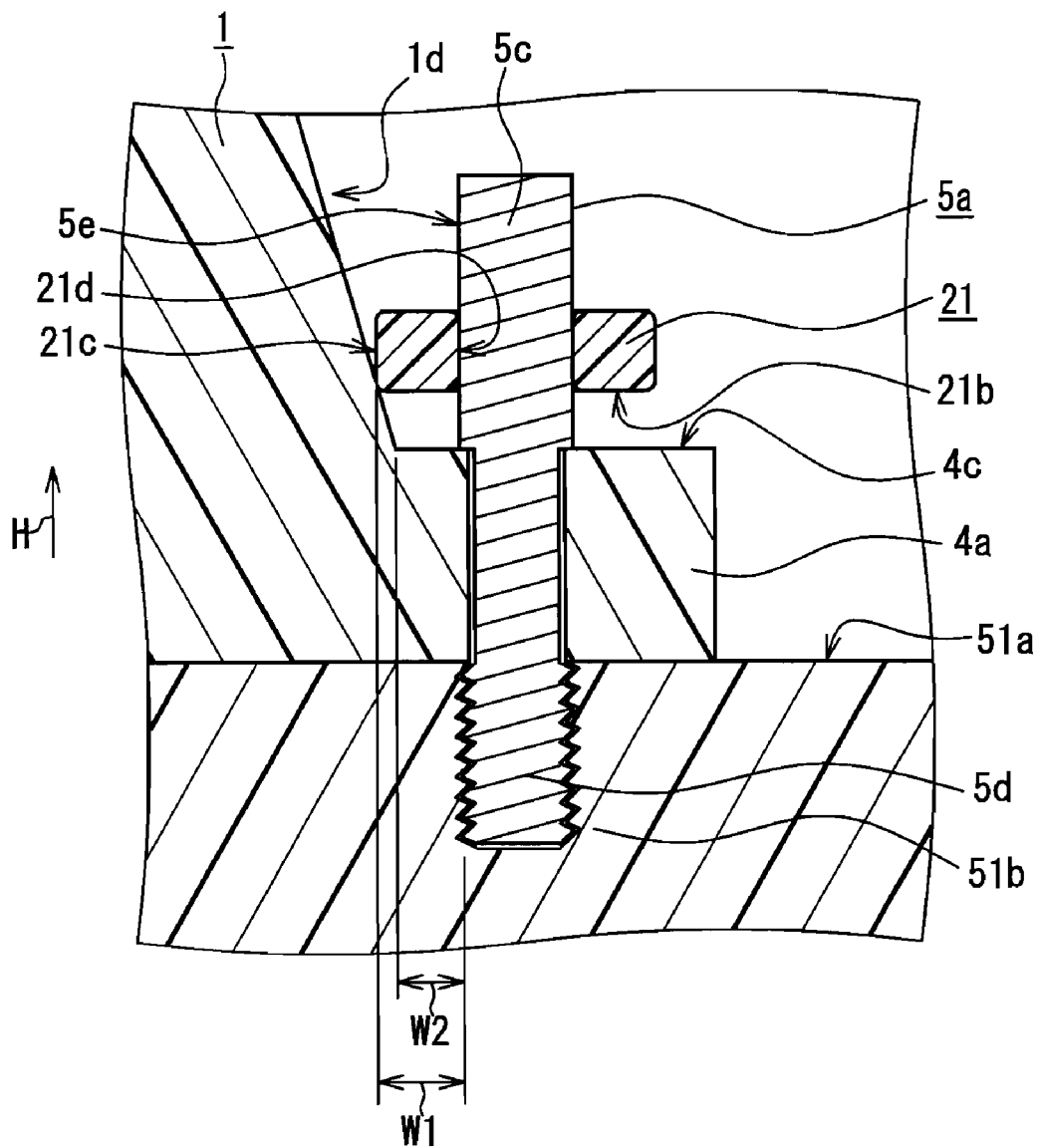
FIG. 6C is a cross-sectional view showing the relevant part in the vicinity of the screw to which the bush is attached.

FIG. 6C is a cross-sectional view showing another example of the attachment of the bush 21. As shown in FIG. 6C, in the case where the right side face 1d of the housing 1 is inclined with respect to an axial direction of the screw 5a screwed into the threaded hole 51b, and a space dimension W2 between the screw 5a and the right side face 1d on the limiting face 4c is smaller than a width dimension W1 of the bush 21, the cylindrical face 21c of the bush 21 into which the head 5c of the screw 5a is pressed comes into contact with the right side face 1d with the bottom face 21b spaced away from the limiting face 4c. In this state, since the head 5c is pressed into the bush 21, friction is produced between the inner face 21d of the through hole 21a and the cylindrical face 5e of the head 5c of the screw 5a, so that the bush 21 can be fixed to the screw 5a. Further, due to friction produced between the cylindrical face 21c of the bush 21 and the right side face 1d of the housing 1, the rotation of the screw 5a about the axis can be regulated. When the rotation of the screw 5a about the axis is regulated, it is possible to restrain the screw 5a from being displaced easily in the direction in which the screw 5a comes loose (direction indicated by the arrow H) and thus to prevent the screw 5a from coming loose due to vibrations and the like.

Further, when the bush 21 is brought into contact with the housing 1 at the position shown in FIG. 6C, a gap can be formed between the bottom face 21b and the limiting face 4c. When a rod-like member such as a flatblade screwdriver is inserted into this gap so as to lift the bush 21 in the direction indicated by the arrow H using the principle or leverage, the bush 21 can be removed from the screw 5a easily without the application of an excessive force.

As described above, it is required for the head 5c of the screw 5a to be pressed into the through hole 21a of the bush 21 while enlarging the inner diameter of the through hole 21a, followed by the fitting of the through hole 21a with the screw 5a. For this reason, the bush 21 is made of an elastic, shrinkable material such as rubber. However, when the bush 21 is to be removed from the screw 5a, the bush 21 is pulled in the direction of the arrow H with the cylindrical face 21c held. In view of this, it is preferable that the cylindrical face 21c is less likely to be deformed. In order to meet both of these requirements, the bush 21 desirably is made of hard rubber.

[3-2. Second Configuration]

Figure 7A:
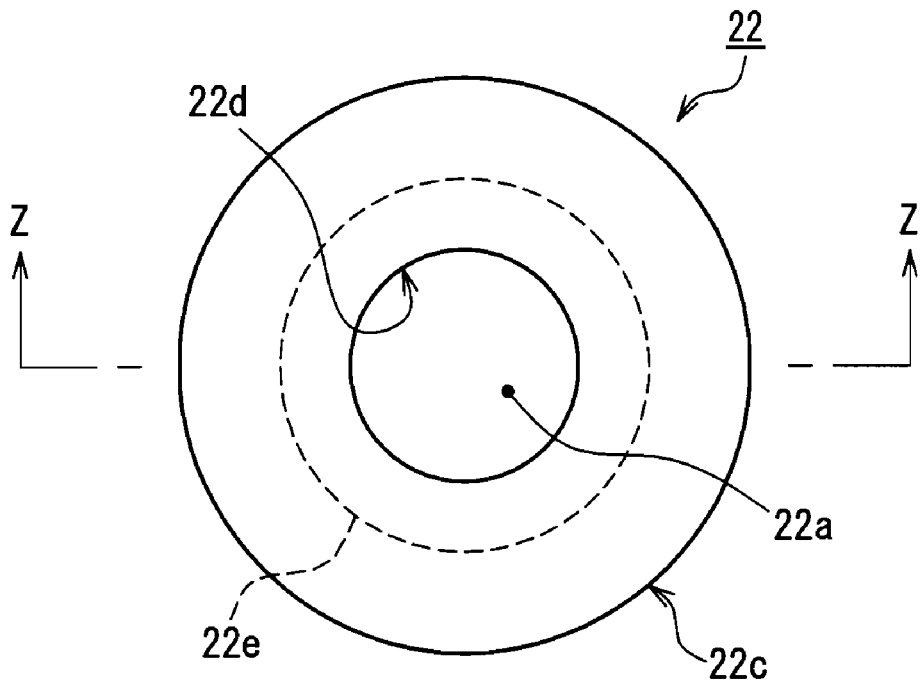
FIG. 7A is a plan view of a bush having a second configuration.
Figure 7B:
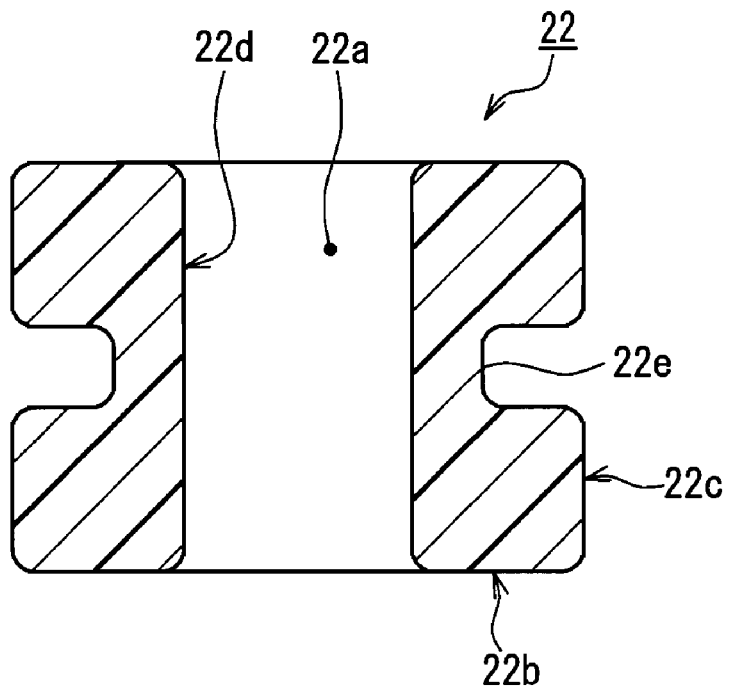
FIG. 7B is a cross-sectional view taken along a line Z-Z in FIG. 7A

FIG. 7A is a perspective view of a bush 22 (having a second configuration). FIG. 7B is a cross-sectional view taken along a line Z-Z in FIG. 7A The bush 22 is formed in an approximately columnar shape as a whole, and has a through hole 22a into which the head 5c of the screw 5a can be pressed, similarly to the above-described bush 21. The head 5c of the screw 5a can be pressed into the bush 22 in the same manner as shown in FIGS. 6B and 6C. Namely, in the case where the bush 22 can be fitted with the head 5c until it comes into contact with the limiting face 4c, friction is produced between the cylindrical face 5e of the head 5c and an inner face 22d of the through hole 22a as well as between a bottom face 22b and the limiting face 4c, so that the rotation of the screw 5a about the axis can be regulated. When the rotation of the screw 5a about the axis is regulated, it is possible to restrain the screw 5a from being displaced easily in the direction in which the screw 5a comes loose (direction indicated by the arrow H) and thus to prevent the screw 5a from coming loose due to vibrations and the like.

Figure 7C:
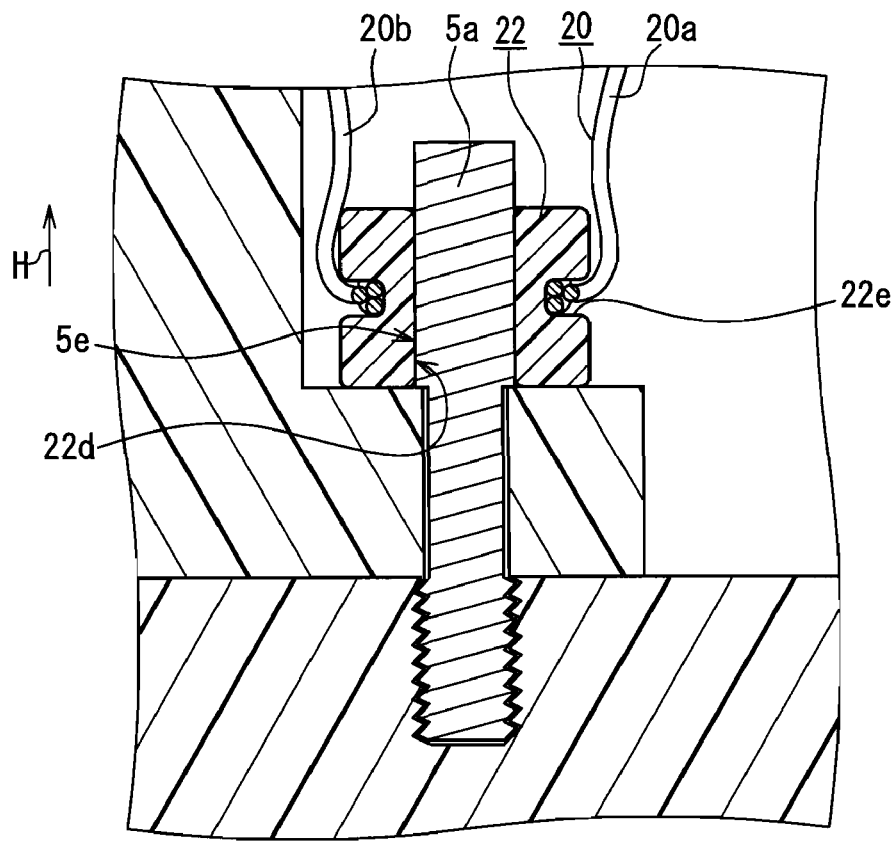
FIG. 7C is a cross-sectional view showing a relevant part in the vicinity of the screw to which the bush is attached.

The bush 22 has a groove 22e on a cylindrical face 22c in addition to the configuration of the bush 21. The groove 22e is formed around the cylindrical face 22c. The groove 22e is wound with a cord or the like when the bush 22 is to be removed from the head 5c of the screw 5a. Since the head 5c of the screw 5a is pressed into the bush 22, friction is produced between the inner face 22d of the through hole 22a and the cylindrical face 5e of the head 5c, which makes it difficult to displace the bush 22 in the direction indicated by the arrow H and to remove it from the head 5c. In view of this, as shown in FIG. 7C, when a cord 20 is wound around the groove 22e and pulled in the direction indicated by the arrow H, the bush 22 can be removed from the head 5c of the screw 5a with a relatively small force. Further, when ends 20a and 20b of the cord 20 are disposed at opposed positions with the screw 5a interposed therebetween and pulled in the direction indicated by the arrow H alternately, the bush 22 can be displaced in the direction indicated by the arrow H more efficiently. Further, when one end side of a cord or the like is wound around the groove 22e, and the other end side of the cord or the like is fixed to a part of the housing 1 of the card holding apparatus or a part of the PC 50, it is possible to avoid the loss of the bush 22 removed from the screw 5a.

[3-3. Third Configuration]

Figure 8A:
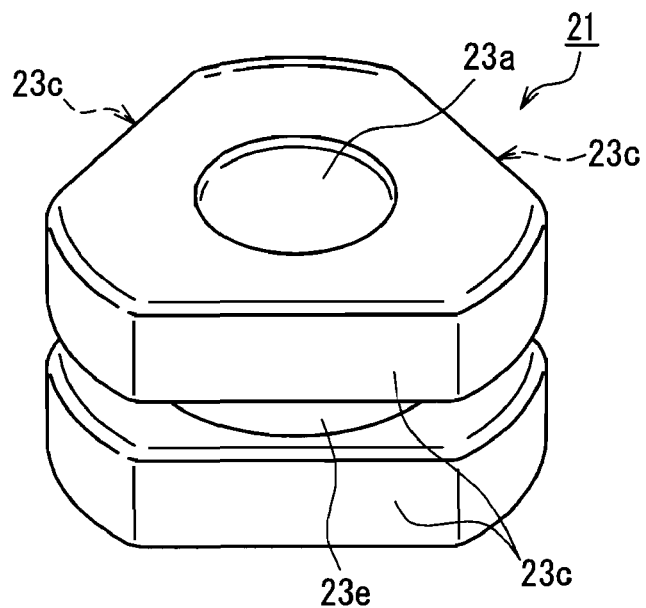
FIG. 8A is a perspective view of a bush having a third configuration.
Figure 8B:
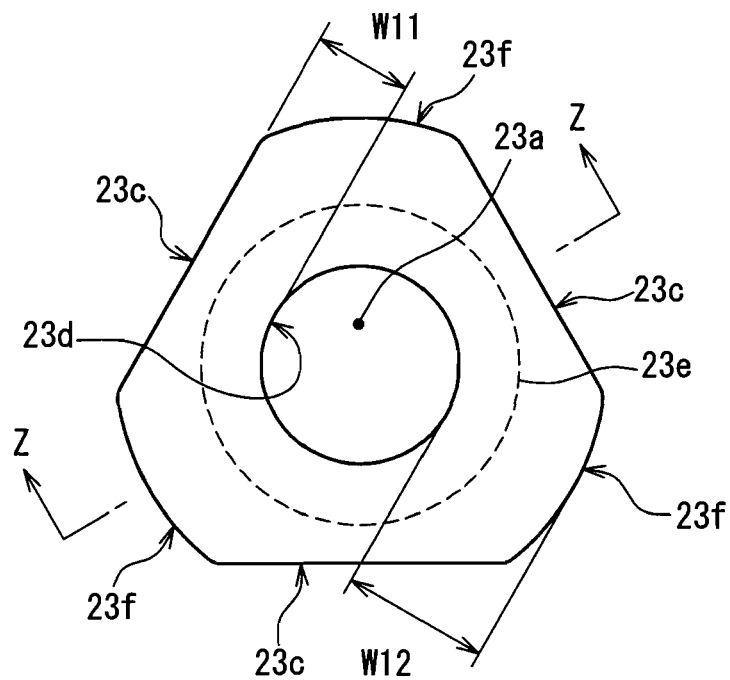
FIG. 8B is a plan view of the bush having the third configuration.
Figure 8C:
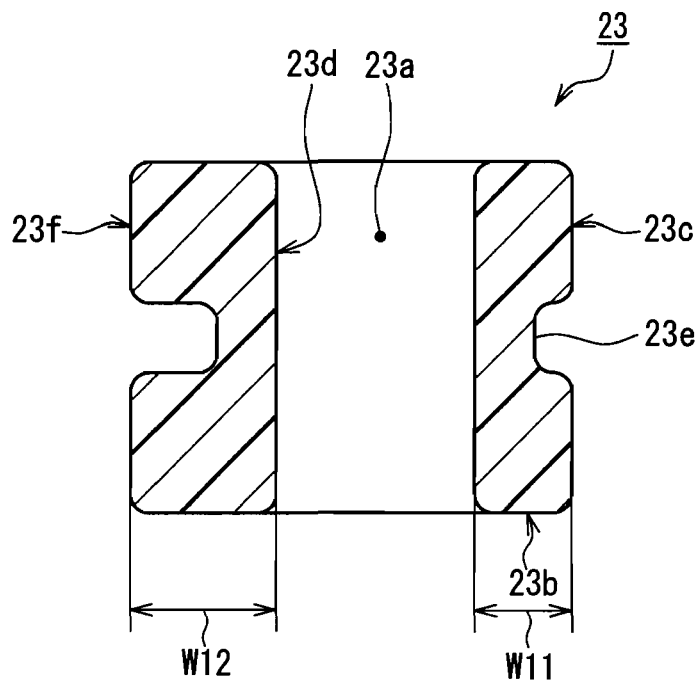
FIG. 8C is a cross-sectional view taken along a line Z-Z in FIG. 8B.

FIG. 8A is a perspective view of a bush 23 (having a third configuration). FIG. 8B is a plan view of the bush 23. FIG. 8C is a cross-sectional view taken along a line Z-Z in FIG. 8B. The bush 23 has a through hole 23a into which the head 5c of the screw 5a can be pressed, similarly to the above-described bush 22. Further, the bush 23 can be fitted with the head 5c of the screw 5a in the same manner as shown in FIGS. 6B and 6C. Namely, in the case where the bush 23 can be fitted with the head 5c until it comes into contact with the limiting face 4c, friction is produced between the cylindrical face 5e of the head 5c and an inner face 23d of the through hole 23a as well as between a bottom face 23b and the limiting face 4c, so that the rotation of the screw 5a about the axis can be regulated. When the rotation of the screw 5a about the axis is regulated, it is possible to restrain the screw 5a from being displaced easily in the direction in which the screw 5a comes loose (direction indicated by the arrow H) and thus to prevent the screw 5a from coming loose due to vibrations and the like.

Further, the bush 23 has a groove 23e that is wound with a cord or the like. The effect to be obtained by forming the groove 23e is the same as that achieved by the above-described groove 22e.

The bush 23 includes plane portions 23c on the cylindrical face 22c of the above-described bush 22. In the present embodiment, the plane portions 23c are formed at three positions at approximately equal intervals. It should be noted that the number of the plane portions 23c is not limited to three, and the plane portion 23c may be formed at at least one position. Further, in the case where a plurality of the plane portions 23c are provided, they may not necessarily be formed at equal intervals.

The plane portions 23c allow the user to hold the bush 23 with his/her fingers easily, and thus the bush 23 can be removed from the screw 5a easily. More specifically, when the user holds the bush 23 with his/her fingers in contact with at least two of the three plane portions 23c, and pulls the bush 23 in the axial direction of the screw 5a (detachment direction) while rotating the bush 23 about the axis of the screw 5a, the bush 23 can be removed from the screw 5a easily. It should be noted that this method of removing the bush 23 is an example.

Further, the bush 23 provided with the plane portions 23c is less likely to roll, and thus it is possible to reduce the likelihood of the loss of the bush 23. More specifically, even if the bush 23 removed from the screw 5a is dropped accidentally on the floor or the like, the likelihood of the loss of the bush 23 can be reduced because the bush 23 provided with the plane portions 23c is less likely to roll on the floor.

Further, as shown in FIGS. 8B and 8C, the bush 23 provided with the plane portions 23c has a width dimension W11 that is smaller than a width dimension W12, W11 being the width dimension between the inner face 23d of the through hole 23a and each of the plane portions 23c and W12 being the width dimension between the inner face 23d of the through hole 23a and an arc portion 23f. Thus, when the bush 23 is to be fitted with the head 5c of the screw 5a, the position at which the bush 23 is rotated about the screw 5a can be selected according to the space dimension between the screw 5a screwed into the threaded hole 51b and the right side face 1d of the housing 1.

Figure 8D:
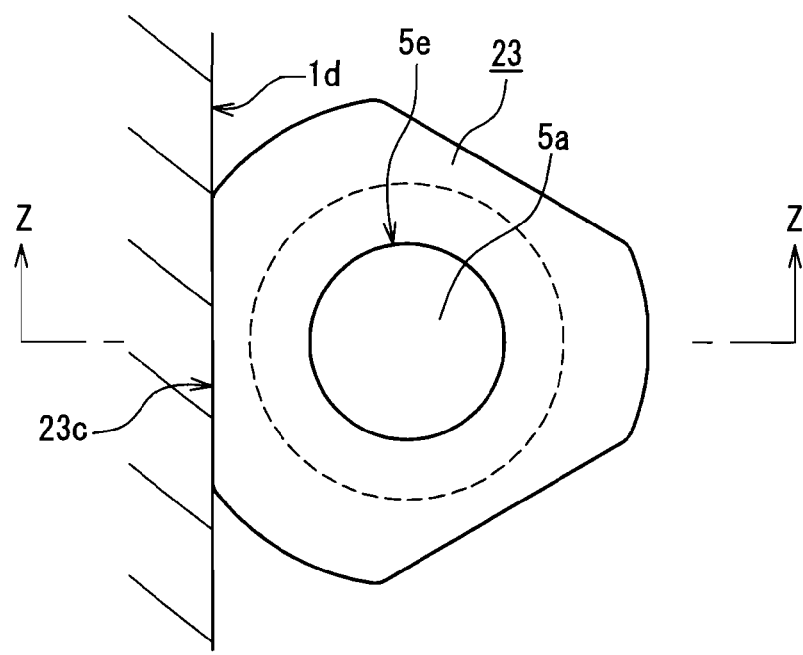
FIG. 8D is a plan view showing a relevant part in the vicinity of the screw to which the bush is attached.
Figure 8E:
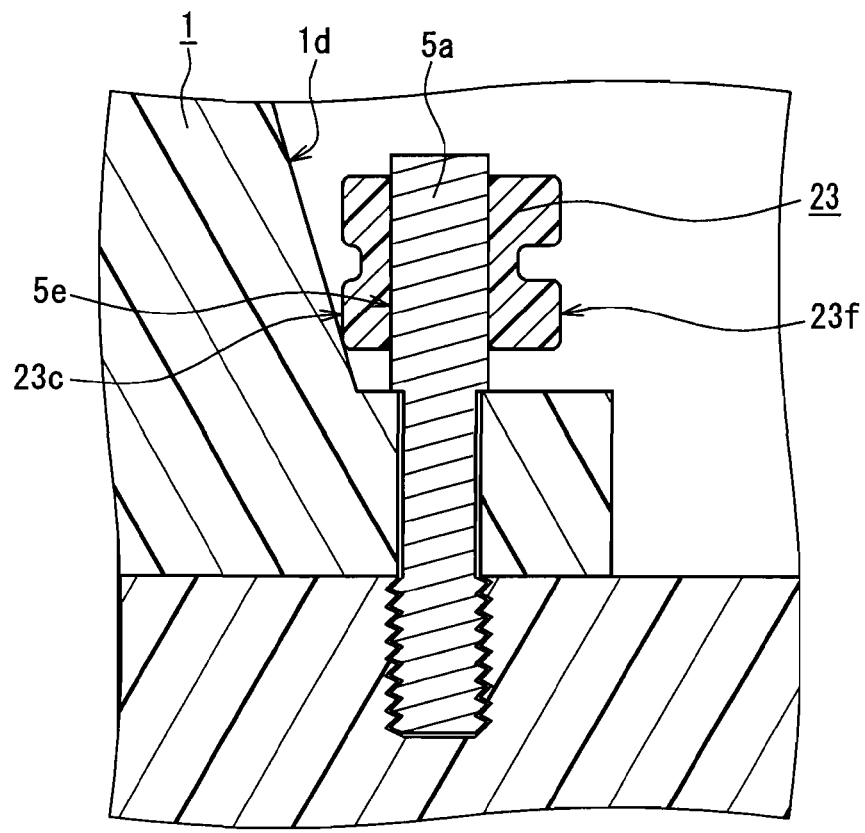
FIG. 8E is a cross-sectional view showing the relevant part in the vicinity of the screw to which the bush is attached.

More specifically, as shown in FIG. 8D (plan view) and FIG. 8E (cross-sectional view taken along a line Z-Z in FIG. 8D), in the case where the space dimension between the cylindrical face 5e of the head 5c of the screw 5a and the right side face 1d of the housing 1 is small, the bush 23 is fitted with the head 5c of the screw 5a at a rotational position where the plane portion 23a comes into contact with the right side face 1d. Here, if the bush 23 is fitted with the head 5c of the screw 5a at a rotational position where the arc portion 23f comes into contact with the right side face 1d, the arc portion 23f may come into contact with the right side face 1d before the head 5c of the screw 5a is inserted into the through hole 23a completely. As a result, sufficient friction cannot be produced between the inner face 23d of the through hole 23a and the cylindrical face 5e of the screw 5a. To avoid this, in the present embodiment, the bush 23 is fitted with the head 5c of the screw 5a at the rotational position where the plane portion 23c comes into contact with the right side face 1d. With this configuration, the plane portion 23c comes into contact with the right side face 1d such that the head 5c of the screw 5a is inserted into the through hole 23a completely. As a result, sufficient friction can be produced between the inner face 23d of the through hole 23a and the cylindrical face 5e of the screw 5a. Thus, the rotation of the screw 5a can be regulated, and thus it is possible to prevent the screw 5a from coming loose.

Figure 8F:
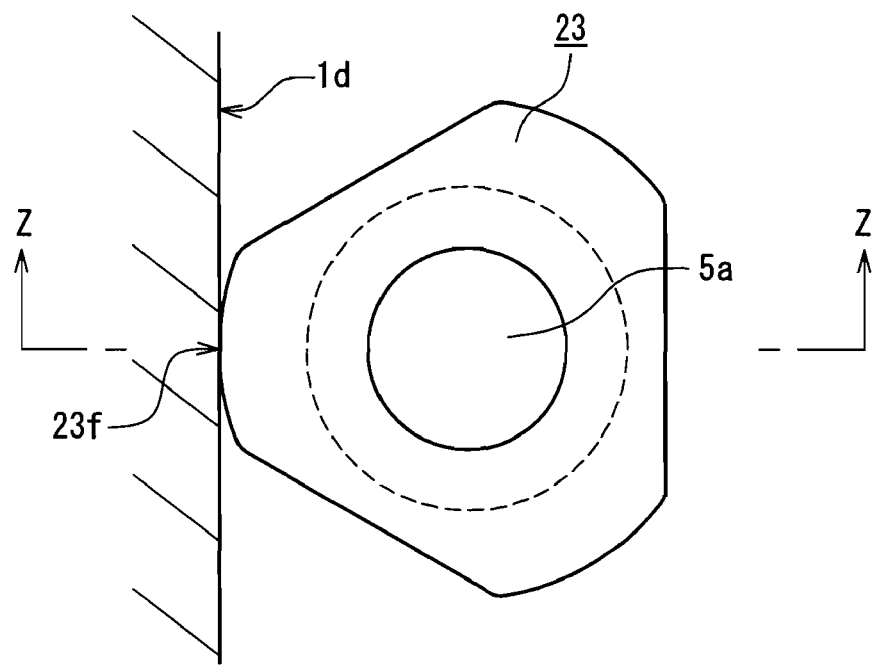
FIG. 8F is a plan view showing the relevant part in the vicinity of the screw to which the bush is attached.
Figure 8G:
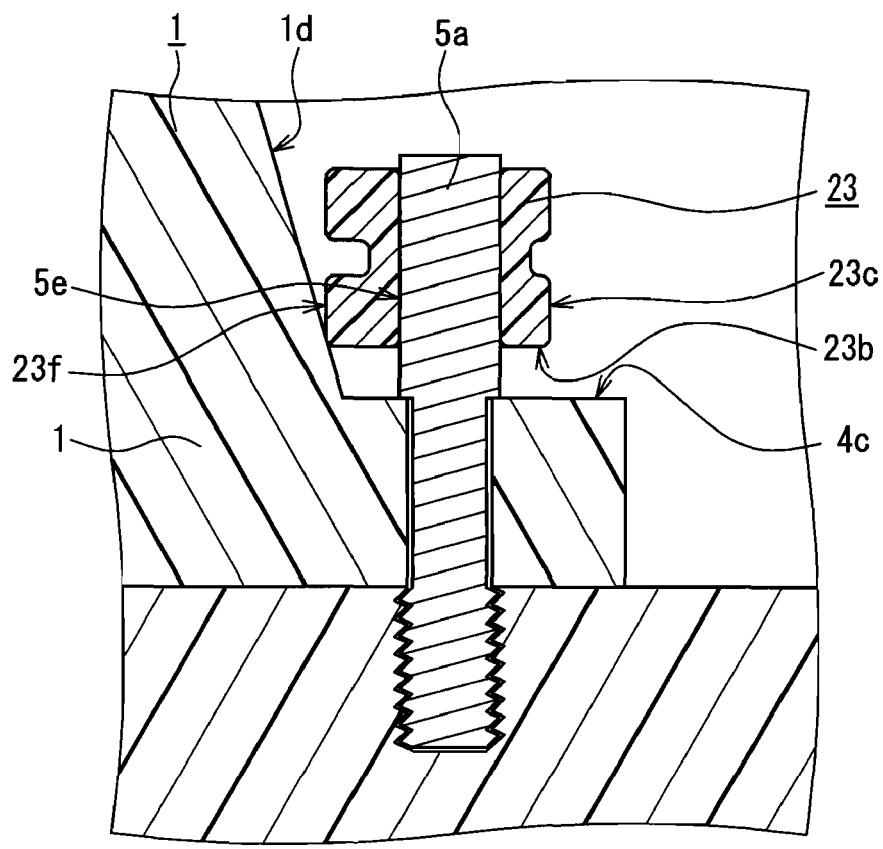
FIG. 8G is a cross-sectional view showing the relevant part in the vicinity of the screw to which the bush is attached.

On the other hand, as shown in FIG. 8F (plan view) and FIG. 8G (cross-sectional view taken along a line Z-Z in FIG. 8F), in the case where the space dimension between the cylindrical face 5e of the head 5c of the screw 5a and the right side face 1d of the housing 1 is large, the bush 23 is fitted with the head 5c of the screw 5a at a rotational position where the arc portion 23f comes into contact with the right side face 1d. It should be noted that in the case where the space dimension between the cylindrical face 5e and the right side face 1d is large, the bush 23 can be fitted with the head 5c of the screw 5a at a rotational position where the plane portion 23c faces the right side face 1d. In this case, if the bush 23 can be fitted with the head 5c of the screw 5a until the bottom face 23b of the bush 23 comes into contact with the limiting face 4c, friction can be produced between the bottom face 23b and the limiting face 4c. Thus, the rotation of the screw 5a can be regulated, and thus it is possible to prevent the screw 5a from coming loose.

In FIG. 8E, in the case where the plane portion 23c of the bush 23 does not come into contact with the right side face 1d, the screw 5a may come loose due to vibrations caused by a disturbance and the like. Even in such a case, however, it further is possible to suppress the rotation of the screw 5a and to prevent the screw 5a from coming loose, because the arc portion 23f adjacent to the plane portion 23c comes into contact with the right side face 1d.

It should be noted that the bush 23 does not necessarily need to have the groove 23e. Even if the bush 23 has an approximately triangular prism shape as a whole without the groove 23e being formed, it is possible to prevent the bush 23 from being detached from the screw 5a easily due to a disturbance such as vibrations.

[3-4. Fourth Configuration]

Figure 9A:
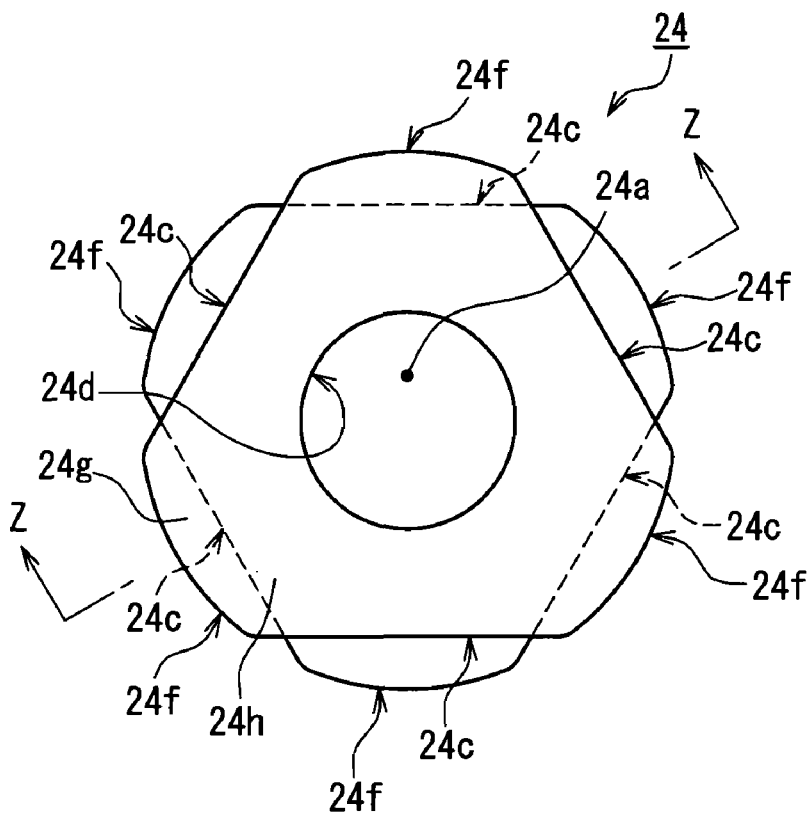
FIG. 9A is a plan view of a bush having a fourth configuration.
Figure 9B:
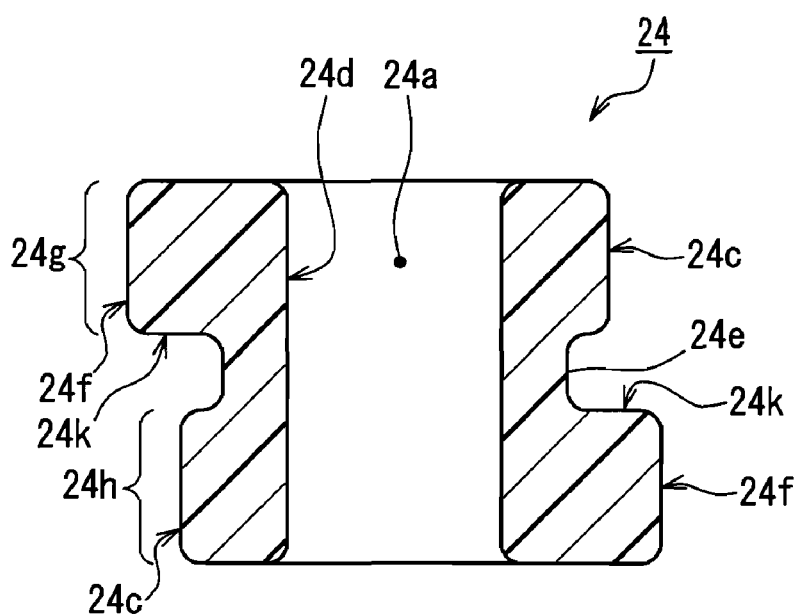
FIG. 9B is a cross-sectional view taken along a line Z-Z in FIG. 9A.

FIG. 9A is a plan view of a bush 24 (having a fourth configuration). FIG. 9B is a cross-sectional view taken along a line Z-Z in FIG. 9A. The bush 24 has a through hole 24a into which the head 5c of the screw 5a can be pressed, between end faces in an axial direction of a column, similarly to the above-described bush 22. Further, the bush 24 can be fitted with the head 5c of the screw 5a in the same manner as shown in FIGS. 6B and 6C. Namely, in the case where the bush 24 can be fitted with the head 5c until it comes into contact with the limiting face 4c, friction is produced between the cylindrical face 5e of the head 5c and an inner face 24d of the through hole 24a as well as between a bottom face 24b and the limiting face 4c, so that the rotation of the screw 5a about the axis can be regulated. When the rotation of the screw 5a about the axis is regulated, it is possible to restrain the screw 5a from being displaced easily in the direction in which the screw 5a comes loose (direction indicated by the arrow H) and thus to prevent the screw 5a from coming loose due to vibrations and the like. Further, the bush 24 has a groove 24e that is wound with a cord or the like. The effect to be obtained by forming the groove 24e is the same as that achieved by the above-described groove 22e.

The bush 24 includes an upper brim portion 24g and a lower brim portion 24h with the groove 24e interposed therebetween. As shown in FIG. 9A, the upper brim portion 24g includes three plane portions 24c and arc portions 24f provided between the respective plane portions 24c. The lower brim portion 24h similarly includes the three plane portions 24c and the three arc portions 24f. The upper brim portion 24g and the lower brim portion 24h are located at positions different from each other in a direction in which the bush 24 is rotated about the screw 5a. More specifically, the plane portions 24c of the upper brim portion 24g and the arc portions 24f of the lower brim portion 24h are disposed at the same positions in a radial direction of the through hole 24a, and the arc portions 24f of the upper brim portion 24g and the plane portions 24c of the lower brim portion 24h are disposed at the same positions in the radial direction of the through hole 24a.

With this configuration, even if the bush 24 removed from the screw 5a is dropped accidentally on the floor or the like, the bush 24 is less likely to roll, and thus it is possible to reduce the likelihood of the loss of the bush 24.

Further, since the arc portions 24f protrude relative to the plane portions 24c in the radial direction of the through hole 24a, the user is allowed to hook his/her fingers on the arc portions 24f when removing the bush 24 from the screw 5a. When the user pushes the bush 24 in its detachment direction with his/her fingers in contact with brim faces 24k adjacent to the arc portions 24f, the bush 24 can be displaced in the detachment direction. In this manner, the bush 24 can be removed from the head 5c of the screw 5a.

It should be noted that the bush 24 does not necessarily need to have the groove 24e. Even if the upper brim portion 24g and the lower brim portion 24h are formed adjacent to each other in the axial direction of the column without the groove 24e being formed, it is possible to prevent the bush 24 from being detached from the screw 5a easily due to a disturbance such as vibrations. Further, even if the upper brim portion 24g and the lower brim portion 24h are formed adjacent to each other in the axial direction of the column, it is possible to form the brim faces 24k, and thus the removal of the bush 24 from the head 5c of the screw 5a can be facilitated.

[3-5. Fifth Configuration]

Figure 10A:
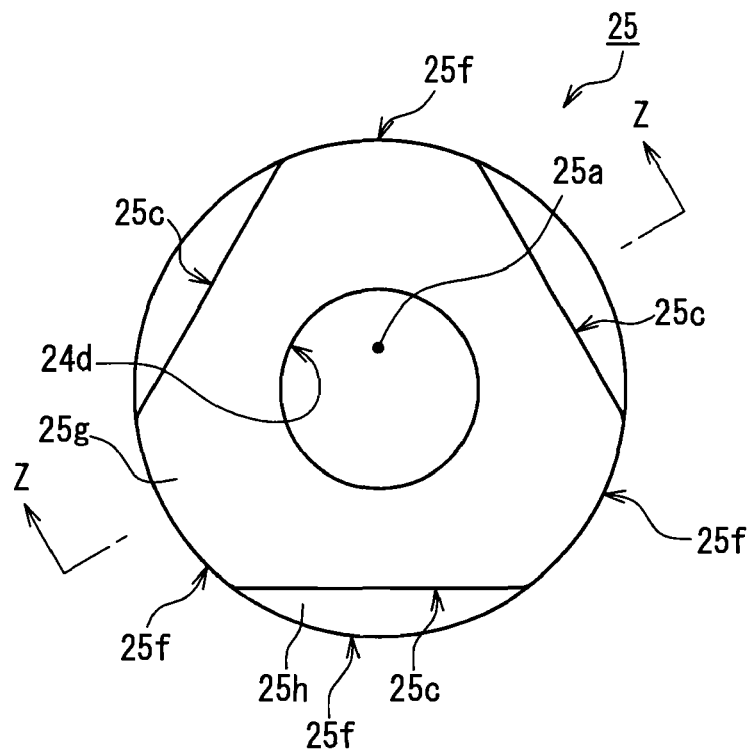
FIG. 10A is a plan view of a bush having a fifth configuration.
Figure 10B:
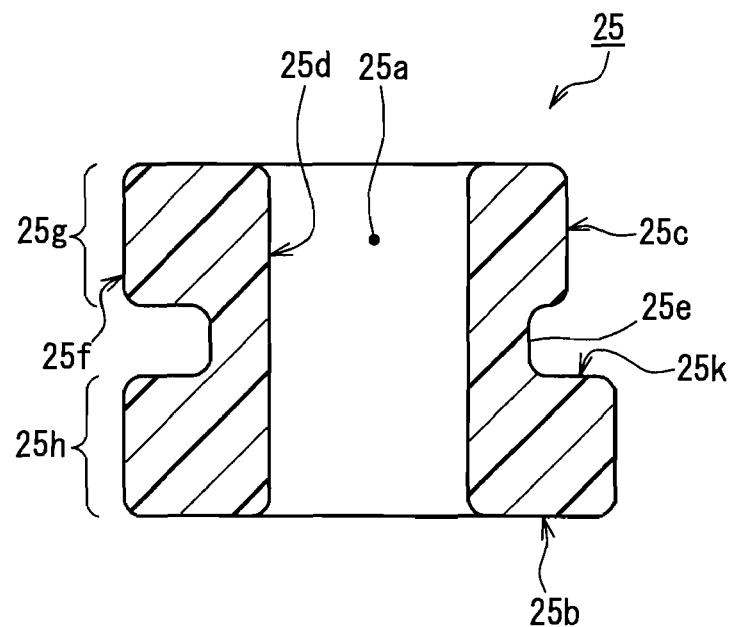
FIG. 10B is a cross-sectional view taken along a line Z-Z in FIG. 10A.

FIG. 10A is a plan view of a bush 25 (having a fifth configuration). FIG. 10B is a cross-sectional view taken along a line Z-Z in FIG. 10A. The bush 25 has a through hole 25a into which the head 5c of the screw 5a can be pressed, between end faces in an axial direction of a column, similarly to the above-described bush 22. Further, the bush 25 can be fitted with the head 5c of the screw 5a in the same manner as shown in FIGS. 6B and 6C. Namely, in the case where the bush 25 can be fitted with the head 5c until it comes into contact with the limiting face 4c, friction is produced between the cylindrical face 5e of the head 5c and an inner face 25d of the through hole 25a as well as between a bottom face 25b and the limiting face 4c, so that the rotation of the screw 5a about the axis can be regulated. When the rotation of the screw 5a about the axis is regulated, it is possible to restrain the screw 5a from being displaced easily in the direction in which the screw 5a comes loose (direction indicated by the arrow H) and thus to prevent the screw 5a from coming loose due to vibrations and the like. Further, the bush 25 also has a groove 25e that is wound with a cord or the like. The effect to be obtained by forming the groove 25e is the same as that achieved by the above-described groove 22e.

The bush 25 includes an upper brim portion 25g and a lower brim portion 25h with the groove 25e interposed therebetween. The upper brim portion 25g includes three plane portions 25c and three arc portions 25f. The lower brim portion 25h has a circular planer shape as shown in FIG. 10A.

With this configuration, even if the bush 25 removed from the screw 5a is dropped accidentally on the floor or the like, the bush 25 is less likely to roll linearly but will tend to roll circularly on the floor, and thus it is possible to reduce the likelihood of the loss of the bush 25.

It should be noted that the bush 25 does not necessarily need to have the groove 25e. Even if the upper brim portion 25g and the lower brim portion 25h are formed adjacent to each other in the axial direction of the column without the groove 25e being formed, it is possible to prevent the bush 25 from being detached from the screw 5a easily due to a disturbance such as vibrations. Further, even if the upper brim portion 25g and the lower brim portion 25h are formed adjacent to each other in the axial direction of the column, it is possible to form brim faces 25k, and thus the removal of the bush 25 from the head 5c of the screw 5a can be facilitated.

[4. Effect of Embodiment etc.]

According to the present embodiment, in a state where an expansion device such as the card holding apparatus is screwed into an information processing unit such as the PC 50 with the screws 5a and 5b, the head 5c of each of the screws 5a and 5b is pressed into the bush 21 made of an elastic material, and the bottom face 21b of the bush 21 is brought into contact with the limiting face 4c of each of the ribs 4a and 4b. With this configuration, friction is produced between the inner face 21d of the bush 21 and the head 5c of each of the screws 5a and 5b as well as between the bottom face 21b of the bush 21 and the limiting face 4c of each of the ribs 4a and 4b, thereby reducing loosening of the screws 5a and 5b. Therefore, even if the expansion device or the information processing unit to which the expansion device is attached is subjected to a disturbance such as vibrations, it is possible to suppress abrupt detachment of the expansion device from the information processing unit due to loosening of the screws 5a and 5b. It should be noted that the same effect can be achieved with respect to the bushes 22 to 25.

Further, the head 5c of each of the screws 5a and 5b is pressed into the bush 21 having an outer diameter that is larger than at least the outer diameter of the head 5c. This allows the user to apply a force easily to the head 5c of each of the screws 5a and 5b in its rotation direction and thus facilitates loosening of the screws 5a and 5b firmly screwed into the threaded holes 51b. Further, since the bush 21 is made of an elastic material, it is less slippery when the user holds and loosens the bush 21 with his/her fingers, which facilitates loosening of the screws 5a and 5b. It should be noted that the same effect can be achieved with respect to the bushes 22 to 25.

Further, as shown in FIG. 6C, even in the case where the space between the head 5c of each of the screws 5a and 5b screwed into the threaded holes 51b and each of the right side face 1d and the left side face 1e of the housing 1 is small, a part of the bush 21 (in the present embodiment, the cylindrical face 21c) comes into contact with a part of the housing 1 (in the present embodiment, each of the right side face 1d and the left side face 1e). With this configuration, it is possible to reduce loosening of the screws 5a and 5b. More specifically, friction produced between the inner face 21d of the bush 21 and the head 5c of each of the screws 5a and 5b as well as between the cylindrical face 21c of the bush 21 and each of the right side face 1d and the left side face 1e contributes to reduced loosening of the screws 5a and 5b. Therefore, even if the expansion device or the information processing unit to which the expansion device is attached is subjected to a disturbance such as vibrations, it is possible to suppress abrupt detachment of the expansion device from the information processing unit due to loosening of the screws 5a and 5b. It should be noted that the same effect can be achieved with respect to the bushes 22 to 25.

Further, as shown in FIGS. 7A to 7C, the bush 22 has the groove 22e on the cylindrical face 22c. When the bush 22 is to be removed from each of the screws 5a and 5b, a cord or the like is wound around the groove 22e and pulled in the detachment direction. As a result, the bush 22 can be removed from each of the screws 5a and 5b with a small force. Further, the user is allowed to hook his/her fingers on the groove 22e when pulling the bush 22 in the detachment direction with his/her fingers. Thus, the bush 22 can be detached easily. It should be noted that the same effect can be achieved with respect to the bushes 23 to 25.

Further, as shown in FIGS. 8A to 8C, the bush 23 has the plane portions 23 on its side face. Accordingly, the bush 23 is less likely to roll, and thus it is possible to reduce the likelihood of the loss of the bush 23 removed from each of the screws 5a and 5b. It should be noted that the same effect can be achieved with respect to the bushes 24 and 25.

Further, as shown in FIGS. 9A and 9B, at least one of the upper brim portion 24g and the lower brim portion 24h protrude relative to the other in the radial direction of the through hole 24a. With this configuration, the user is allowed to hook his/her fingers on the bush 24 easily when removing the bush 24 from each of the screws 5a and 5b. Thus, the bush 24 can be removed from each of the screws 5a and 5b easily. It should be noted that the same effect can be achieved with respect to the bush 25.

In the present embodiment, the card holding apparatus is an example of the expansion device. However, the present invention is not limited thereto. For example, in the case where the bush of the present embodiment is attached to each screw mounted on a video output cable that is in conformity with the DVI (Digital Visual Interface) standard, it is possible to prevent the DVI cable from being detached from a PC or a monitor easily due to a disturbance such as vibrations. In this configuration, the DVI cable corresponds to the electronic equipment of the present invention.

Further, in the present embodiment, the bushes 21, 22, and 23 have a columnar shape or an approximately triangular prism shape. However, the shape of the bushes is not limited thereto. For example, a quadratic prism shape, a pentagonal prism shape, and the like are also available.

Further, in the present embodiment, the through hole formed in the bush has a circularly cylindrical inner wall. However, the shape of the inner wall is not limited thereto. It is preferable that the through hole has an angularly cylindrical inner wall, and the head of the screw also has an angularly cylindrical shape, because this allows the bush and the screw to be fitted with each other more firmly when the head of the screw is pressed into the through hole.

Further, in FIG. 6B, it is preferable that a gap is present between an end of the male screw portion 5d of the screw 5a in a screw direction and a bottom of the threaded hole 51b, because this allows the rib 4a to be sandwiched between the head 5c of the screw 5a and the side face 51a of the housing 51 without looseness. The same applies to the screws shown in FIGS. 6C, 7C, 8E, and 8G.

Further, the housing 1 of the present embodiment is an example of the housing of the present invention. The through hole 4d of the present embodiment is an example of the support portion of the present invention. The bushes 21 to 25 of the present embodiment are examples of the elastic member of the present invention.

The electronic equipment of the present invention is useful for equipment that can be fixed to an information processing unit or the like with screws.

Regarding the present embodiment, the following notes are disclosed.

(Note 1)

Electronic equipment that enables a first housing to be screwed to a second housing with a screw, the equipment including: a support portion that is formed in the first housing and in which the screw is inserted and supported; and an elastic member that can be attached removably to a head of the screw that is inserted and supported in the support portion, wherein the elastic member includes: a through hole into which the head of the screw can be pressed and mounted; and a contact portion where at least a part of the elastic member is in contact with the first housing when the head of the screw is pressed and mounted into the elastic member.

(Note 2)

The electronic equipment according to Note 1, wherein the elastic member is formed into a columnar shape, the through hole is formed between both end faces of the elastic member in an axial direction of a column, and one of the both end faces of the elastic member in the axial direction of the column is in contact with the first housing when the head of the screw is pressed into the through hole.

(Note 3)

The electronic equipment according to Note 1, wherein the elastic member is formed into a columnar shape, the through hole is formed between both end faces of the elastic member in an axial direction of a column, and a part of a side face of the elastic member parallel to the axial direction of the column is in contact with the first housing when the head of the screw is pressed into the through hole.

(Note 4)

The electronic equipment according to Note 2 or 3, wherein the elastic member has at least one plane on a side face parallel to the axial direction of the column.

(Note 5)

The electronic equipment according to any one of Notes 2 to 4, wherein the elastic member has a groove between the both end faces in the axial direction of the column.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. Electronic equipment that enables a first housing to be screwed to a second housing with a screw, the equipment comprising:
    a support portion that is formed in the first housing and in which the screw is inserted and supported; and
    an elastic member that can be attached removably to a head of the screw that is inserted and supported in the support portion,
    wherein the elastic member comprises:
    a through hole into which the head of the screw can be pressed and mounted; and
    a contact portion where at least a part of the elastic member is in contact with the first housing when the head of the screw is pressed and mounted into the elastic member.

2. The electronic equipment according to claim 1,
    wherein the elastic member is formed into a columnar shape,
    the through hole is formed between both end faces of the elastic member in an axial direction of a column, and
    one of the both end faces of the elastic member in the axial direction of the column is in contact with the first housing when the head of the screw is pressed into the through hole.

3. The electronic equipment according to claim 2, wherein the elastic member has at least one plane on a side face parallel to the axial direction of the column.

4. The electronic equipment according to claim 3, wherein the elastic member has a groove between the both end faces in the axial direction of the column.

5. The electronic equipment according to claim 2, wherein the elastic member has a groove between the both end faces in the axial direction of the column.

6. The electronic equipment according to claim 1,
    wherein the elastic member is formed into a columnar shape,
    the through hole is formed between both end faces of the elastic member in an axial direction of a column, and
    a part of a side face of the elastic member parallel to the axial direction of the column is in contact with the first housing when the head of the screw is pressed into the through hole.

7. The electronic equipment according to claim 6, wherein the elastic member has at least one plane on the side face parallel to the axial direction of the column.

8. The electronic equipment according to claim 6, wherein the elastic member has a groove between the both end faces in the axial direction of the column.

* * * * *